(12) United States Patent
Hsieh et al.

(10) Patent No.: US 7,337,227 B1
(45) Date of Patent: Feb. 26, 2008

(54) SYSTEM AND METHOD FOR CABLING COMPUTER EQUIPMENT FOR A DESIRED INSTALLATION

(75) Inventors: Jenwei Hsieh, Austin, TX (US); Victor V. Mashayekhi, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 611 days.

(21) Appl. No.: 09/637,039

(22) Filed: Aug. 10, 2000

(51) Int. Cl.
*G06F 15/16* (2006.01)
(52) U.S. Cl. .......................... 709/227; 709/217; 71/62; 714/25; 379/230
(58) Field of Classification Search ................ 709/227, 709/217, 250, 224; 710/62; 714/25; 379/230; 370/522
See application file for complete search history.

(56) References Cited

U.S. PATENT DOCUMENTS

| | | | |
|---|---|---|---|
| 4,985,855 A | 1/1991 | Aldrich et al. | 364/522 |
| 5,590,287 A | 12/1996 | Zeller et al. | 395/250 |
| 5,704,189 A | 1/1998 | Collier | 52/741.1 |
| 5,708,772 A * | 1/1998 | Zeldin et al. | 714/25 |
| 5,745,795 A * | 4/1998 | Pecone et al. | 710/62 |
| 5,751,575 A | 5/1998 | Hirosawa et al. | 364/188 |
| 5,761,294 A * | 6/1998 | Shaffer et al. | 379/230 |
| 5,995,729 A | 11/1999 | Hirosawa et al. | 395/500.01 |
| 6,393,467 B1 * | 5/2002 | Potvin | 709/217 |
| 6,466,989 B1 * | 10/2002 | Chu | 709/250 |
| 6,490,297 B1 * | 12/2002 | Kraml et al. | 370/522 |

FOREIGN PATENT DOCUMENTS

WO 99/00806 1/1999

OTHER PUBLICATIONS

Pending U.S. Appl. No. 09/330,725 entitled "Method and System for Establishing a Storage Area Network Configuration" by Ahmad Tawil; Dell USA, L.P., filed Jun. 11, 1999.
Pending U.S. Appl. No. 09/426,932 entitled "Dynamic Virtual Local Area Network Connection Process" by Richard Amberg, et al.; Dell USA, L.P., filed Oct. 22, 1999.
Pending U.S. Appl. No. 09/428,364 entitled "Computer System and Documentation Arrangement Guiding System Installation" by Michelle Ewell, et al.; Dell USA, L.P., filed Oct. 28, 1999.

* cited by examiner

*Primary Examiner*—William Vaughn
*Assistant Examiner*—Thanh Tammy Nguyen
(74) *Attorney, Agent, or Firm*—Baker Botts L.L.P.

(57) ABSTRACT

A system and method are disclosed for performing the installation of cabling in a computing system. In one embodiment, one or more configuration utilities are employed which guide an installer through the appropriate sequence of cable connections for a given computing system. By illuminating various LEDs present on the assorted computing components, an installer is provided with an indication of which component and which port should be connected first, second and so on such that an installation results in a robust computing system.

17 Claims, 3 Drawing Sheets

SYSTEM AND METHOD FOR CABLING COMPUTER EQUIPMENT FOR A DESIRED INSTALLATION

TECHNICAL FIELD

The present invention relates generally to computer installation instruction and, more particularly, to a system and method for cabling a computing system.

BACKGROUND

Today, computers and their assorted peripherals are generally interconnected with a plurality of cables. In some instances, it may be that only one cable will fit in a particular computer slot and yet, in other cases, it may be possible for multiple cables to fit into a particular computer slot. To solve such problems, many computers and peripherals are being designed to use one communication scheme and therefore one cabling format. Universal Serial Bus is one such technology.

While such measures may become useful in the area of personal computers, large scale computing system implementations, such as server farms and server clusters, do not presently have the same luxury and are such a solution is not being considered. As such, large scale computing system implementations generally require many different cables of many different forms to interconnect many different computing components.

In addition to the task of connecting an appropriate cable to an appropriate port, the computing components used for large scale computing system implementations are often required to be connected in a predetermined topology. The results of cabling such complex computer installations out of order often include unexpected behavior of the system, system lock-ups as well as many additional otherwise avoidable problems. Miscabling in such large scale implementations, not to mention in the area of personal computers, can also result in numerous customer support and service issues.

Currently, the solution to cabling large scale computing systems has generally been to employ a trained cable installer. However, even when employing the services of a trained cable installer, detailed graphs, charts and instructions must still be followed to ensure both proper connections as well as the proper sequencing of connections. With the speed of technological advancement being what it is, whether or not a cable installer has up-to-date cabling instructions may be yet another concern during such an installation.

SUMMARY

In accordance with teachings of the present disclosure, a system and method are described for cabling a computer system. Accordingly, in one embodiment, a method for cabling a plurality of computing components is provided. The method preferably includes determining a cabling connection to be made between a first computing component and a second computing component. The method preferably further includes generating a signal on the first computing component and the second computing component indicative of the cabling connection to be made.

In an alternate embodiment, an apparatus for cabling a computer system is provided. The apparatus generally includes at least one processor and memory preferably associated with the at least one processor. A management communications interface preferably coupled to a communications network, the processor and the memory is also preferably included in the apparatus. Generally to effect cabling, the apparatus preferably includes a program of instructions storable in the memory and executable in the processor. The program of instructions is preferably operable to generate at least one signal indicative of a cabling connection to be made to at least a first computing component of a plurality of computing components preferably coupled to the communications network.

In yet another embodiment, a computing system preferably including a plurality of computing components is provided. Each of the plurality of computing components preferably includes a management communications interface preferably coupled to a communications network and at least one port operable to connect to at least one port on at least one of the remaining plurality of computing components. In the computing system, at least one of the plurality of computing components is preferably operable to identify a first computing component to be connected to a second computing component and to identify the second computing component to be connected to the first computing component. Preferably upon identifying the first and second computing components, the at least one computing component may generate at least one signal on the first computing component indicative of a cabling connection to be made between the first computing component and the second computing component.

One technical advantage provided by the present disclosure is a reduction in the number of customer support and service issues resulting from a computer installation.

An additional technical advantage provided by the present disclosure is the ability to adapt cabling instruction to a variety computer installations as well as to available computing components.

Yet another technical advantage provided by the present disclosure is the ability to employ current computing component hardware to effect a complex computing system cable installation.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
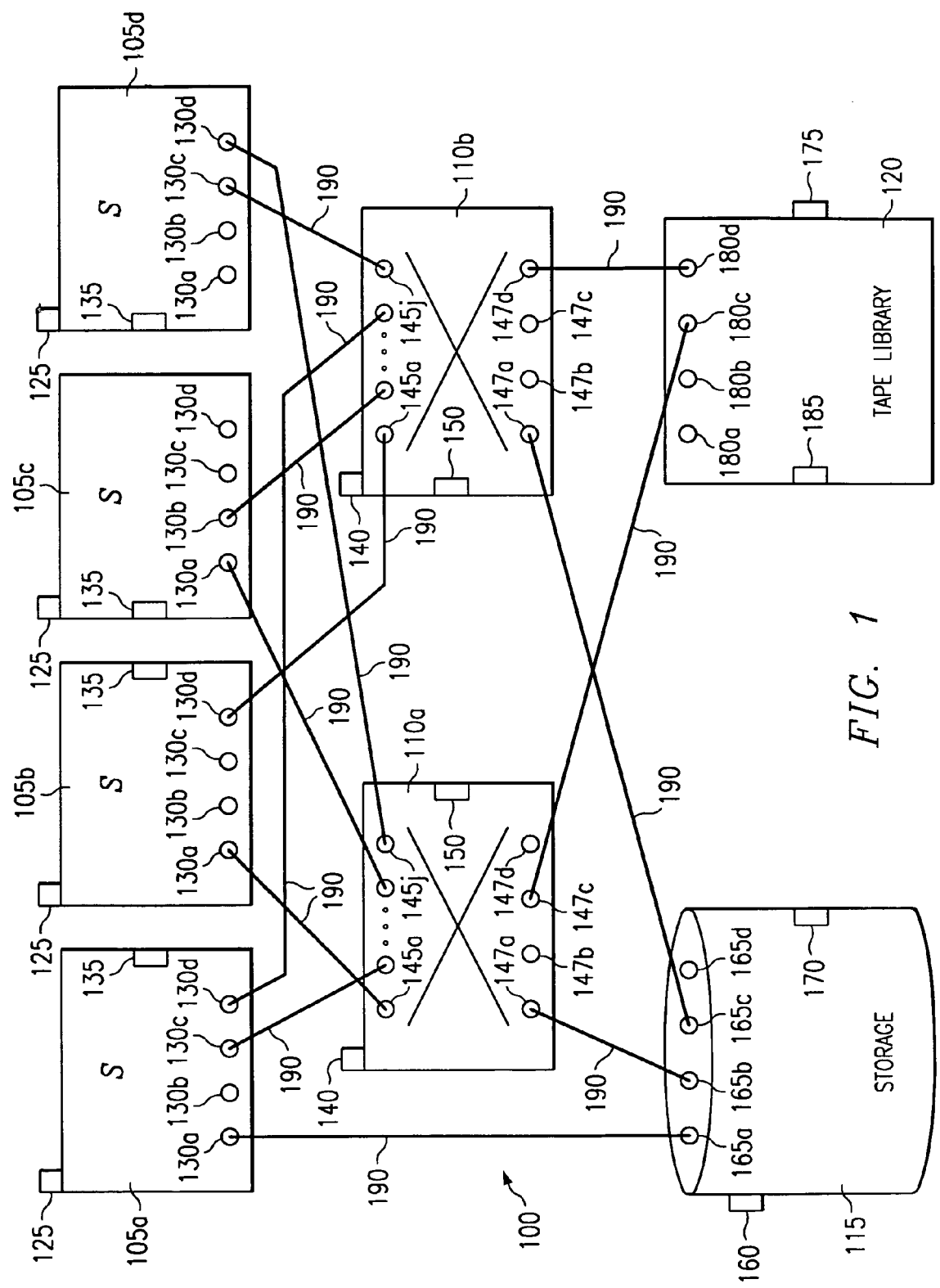
FIG. 1 is a schematic diagram illustrating a computing system cabled according to teachings of the present disclosure.
Figure 2:
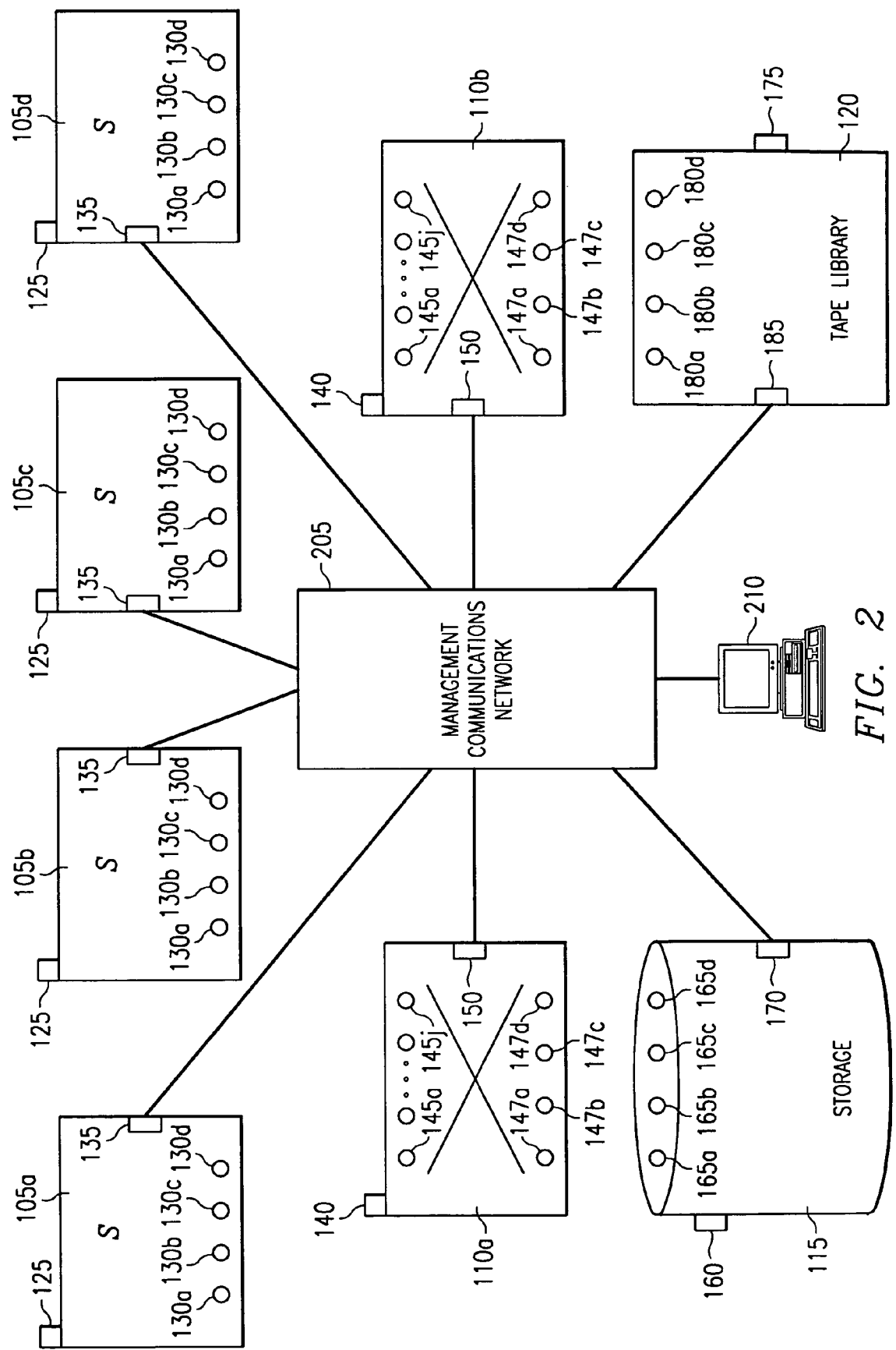
FIG. 2 is a schematic diagram illustrating a computing system to be cabled according to teachings of the present disclosure.
Figure 3:
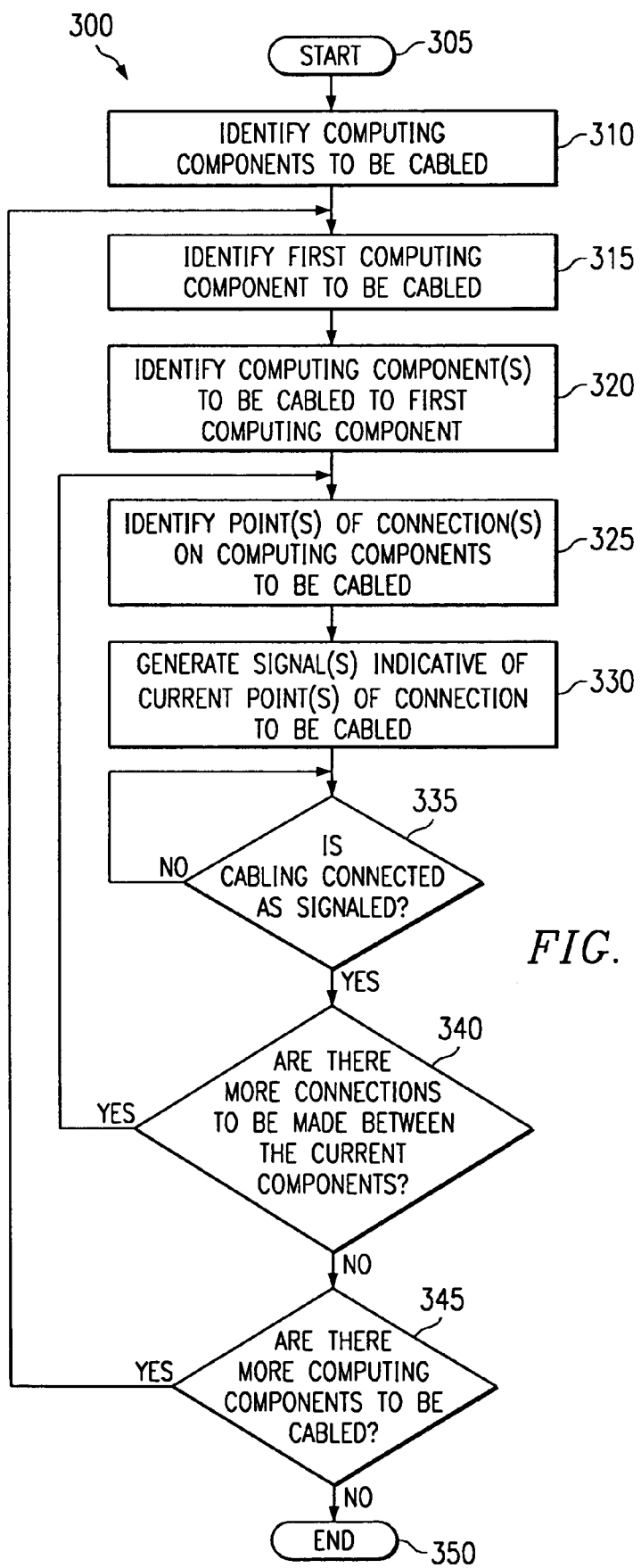
FIG. 3 is a flow diagram illustrating a method for cabling a computing system incorporating teachings of the present disclosure.

Preferred embodiments and their advantages are best understood by reference to FIGS. 1 through 3, wherein like numbers are used to indicate like and corresponding parts. Accordingly, to overcome limitations and difficulties in current methods of cabling computer installations, a method and system have been developed which are capable of guiding a cable installer through computer installation with multiple components.

FIG. 1 illustrates one embodiment of a computing system cabled according to teachings of the present disclosure. In addition to the numerous interconnections to be made, computing systems such as computing system 100 must often be cabled in a specific order. As such, FIG. 1 illustrates one example of the cabling complexity with which computing systems are typically associated. For example, the decision as to whether servers 105a-105d are to be coupled to switches 110a and 110b before server 105a is coupled to storage unit 115 or whether server 105a is to be coupled to storage unit 115 before coupling switches 110a and 110b to servers 105a-105d is just one of the many cabling complexities associated with sophisticated computing systems such as computing system 100.

As such, preferably included in computing system 100 are servers 105a-105d, switches 110a and 110b, storage unit 115 and tape library 120. Computing system 100 may also include one or more routers, hubs, clients as well as various other computing components operable to function as a part of computing system 100.

Servers 105a-105d preferably include component LEDs 125 (light emitting diode) and device LEDs 130a-130d. Also preferably included on servers 105a-105d is management communications interface 135. Similarly, switches 110a and 110b preferably include component LEDs 140, device LEDs 145a-145j and device LEDs 147a-147d. Management communications interface 150 is also preferably included on switches 110a and 110b.

Storage unit 115 preferably includes component LED 160, device LEDs 165a-165d and management communications interface 170. Similarly, tape library 120 preferably includes component LED 175, device LEDs 180a-180d and management communications interface 185. The uses and purposes of the various component LEDs, device LEDs and management communication interfaces will be described in greater detail below.

Interconnecting the computing components of system 100 are cables or patch cables 190. Depending upon the type of connection to be made between respective computing components, cables 190 may be Ethernet, Gigabit Ethernet, Fibre Channel, USB, Fire Wire, parallel, serial, SCSI or any other format operable to interconnect the computing components of a computing system such as computing system 100.

According to the present disclosure, the cabling of computing system 100 may be enabled by preferably coupling each of the computing components of computing system 100 to management communications network 205 as illustrated in FIG. 2. Management communications interfaces 135, 150, 170 and 180 preferably enable such coupling. Management communications network 205 may be a fast Ethernet network, or other network form operable to communicate with one or more computing components on a systems management or higher level. Accordingly, management communications interfaces 135, 150, 170 and 180 may be Ethernet ports, serial ports, Fibre Channel ports, etc.

Many currently manufactured computing components are generally designed with at least one form of management communication ability for such purposes as computing component addressing, network configurations, software downloads and the like. Such communication ability enables a cable installer to use laptop computer 210 or another suitable device enabled with teachings of the present disclosure to communicate with the computing components to be incorporated into a computing system such as computing system 100. By coupling laptop computer 210 enabled with teachings of the present disclosure to management communications network 205, proper, effective and efficient cabling of computing system 100 may be achieved.

Referring now to FIG. 3, a flow diagram of a method for cabling a computing system is illustrated. In general, method 300 of FIG. 3 preferably provides a cable installer with signals or prompts such that the cable installer may be led through the preferred or proper cabling of a computing system installation. Method 300 may be implemented as a set of instructions that are storable in memory and executable by a processor of a computing component.

Upon beginning at step 305, method 300 may effect communication with the plurality of computing components preferably coupled to management communications network 205 such that each of the computing components may be identified, as indicated at step 310. Identification may include obtaining what type of component is to be cabled into a computing system, i.e., server, router, hub, bridge, storage device, etc. Identification of the computing components may also include determining what type of connection will be used for each computing component, i.e., Ethernet connections, SCSI (small computer system interface) connections, Fibre Channel connections, serial connections, etc. Various address assignments associated with each computing component may also be identified during step 310 of method 300. For example, a MAC (Media Access Control) address, IP (Internet protocol) address, Ethernet port address, etc., may be acquired from each computing component to be cabled into a computing system.

Once the computing components to be cabled into a computing system have been identified as desired at step 310, method 300 may proceed to step 315. At step 315, the cabling sequence of the computing components is preferably determined. Such a cabling sequence may be determined one computing component at a time or, an entire computing system cabling sequence may be determined prior to initiation of cabling.

Accordingly, at step 315, a first computing component to be cabled may be identified. Once a first computing component to be cabled has been identified, method 300 may proceed to step 320.

At step 320, identification of one or more computing components to be cabled to the first computing component identified at step 315 is preferably performed. Depending on the computing system being cabled, one computing component may be coupled to the first computing component identified at step 315 or a plurality of computing components may be coupled thereto. As such, step 320 may be designed such that each of the computing components to be coupled to the first computing component identified at step 315 is identified. Alternatively, step 320 may be designed such that only one of the plurality of computing components to be cabled to the first computing component is identified and selected for cabling.

Upon identification of the one or more computing components to be cabled to the first computing component, method 300 may proceed to step 325. At step 325, one or more connection points or ports on each computing component to be cabled may be identified. For example, if server 105a has been selected as the first computing component to be cabled and switch 110a is the computing component to which it is to be connected or cabled, it may be preferable to use an Ethernet connection or port on server 105a to cable server 105a to a similar port on switch 110a. Similarly, if server 105a is selected as the first computing component to be cabled and storage unit 115 is the computing component to which server 105a is to be cabled, it may be desirable to use a Fibre Channel connection or port on server 105a for the cabling connection between the respective computing components. Alternatively, a SCSI connection may be preferred by storage unit 115 thereby requiring a SCSI port on server 105a to be employed for the cabling connection between the respective computing components.

Upon selection of one or more connection points or ports at step 325, method 300 may proceed to step 330. At step 330, guidance for the cabling of the first computing component to be cabled to the remaining computing components may begin.

At step 330, one or more signals may be generated to indicate to a cable installer the location of the cabling connections to be made. As such, component LEDs 125, 140, 160 and 175 may be employed to first indicate which components are to be cabled together. Subsequently, device LEDs 130a-130d, 145a-145j, 147a-147d, 165a-165d and 180a-180d may be employed to indicate which connection points or ports on the identified computing components are to be cabled. In addition to or in replacement of illuminating LEDs present on the computing components to be cabled, alternate signaling implementations may be employed alone or in combination. Such signaling implementations may include, but are not limited to, generating beep codes, powering on only selected components, generating flashing codes using assorted LEDs or other indicators, etc. Additionally, different forms of signalling may also be employed to indicate different things. For example, a green LED may indicate that an Ethernet cable is to be used while a yellow LED may indicate that a SCSI cable is required. Other embodiments of altering the signal are considered within the scope of the present disclosure.

As an installation example, in a computing system 100 implementation where server 105a is to be coupled to storage unit 110b and switch 110a, method 300 may illuminate component LED 125 of server 105a to indicate that server 105a is the next computing component to be cabled. Next, method 300 may illuminate component LED 140 of switch 110a to indicate that server 105a is to be cabled to switch 110a.

Upon identifying an appropriate port, such as an Ethernet port, on server 105a, method 300 may illuminate device LED 130c to indicate that the device associated with device LED 130c is to have one end of an appropriate cable connected thereon. In addition, method 300 may also illuminate device LED 145b on switch 110a to indicate that a device associated with device LED 145b is to have the opposite end of the cable connected thereon. Accordingly, method 300 has indicated to a cable installer that a cable connection is to be made between a device associated with device LED 130c of server 105a and a device associated with device LED 145b of switch 110a.

Upon verifying that no further connections are desired between server 105a and switch 110a, method 300 may determine that it is now time to cable server 105a to storage unit 115. Accordingly, method 300 may again illuminate component LED 125 of server 105a and component LED 160 of storage unit 115 to indicate that these two components are to be cabled together. Upon selection of the appropriate ports or devices to be connected amongst server 105a and storage unit 115, method 300 may illuminate device LED 130a, for example a Fibre Channel port, of server 105a and device LED 165a of storage unit 115 to indicate a cabling connection to be made between ports on the devices indicated by the respective device LEDs.

In part to effect proper cabling of a computing system 100, it may be desirable to ensure that the preferred ports or connection points of the current computing components have been cabled as desired. Such a verification is provided for at step 335 of method 300. Accordingly, in one embodiment of method 300, upon generation of the signals indicative of cabling connections to be made, method 300 may proceed to step 335 of FIG. 3. At step 335, verification of the cabling connection between the indicated computing components and/or the identified ports or devices may be performed. Such a verification may be employed in such scenarios where the order in which computing components are to be cabled will have significant effects on computing system 100 performance.

At step 340 of method 300, the computing components currently being connected are evaluated to determine whether there are additional ports included on the respective computing components which require cabling. If a determination is made that there exists additional ports to be cabled, method 300 may proceed to step 325 for proper identification of the one or more ports to be cabled and a reiteration of the remaining steps of method 300. If the results of the determination indicate that there are no additional ports on the current computing components to be cabled, method 300 may proceed to step 345.

At step 345, method 300 may again evaluate the computing components connected to management communications network 205 to determine whether any computing components remain to be cabled. Should one or more computing components be identified at step 345 as requiring cabling connections, method 300 may proceed to step 315 such that the next computing components to be cabled may be identified, appropriately cabled and a reiteration of the remaining steps of method 300. Should a determination be made at step 345 that all of the computing components to be cabled have been cabled, method 300 may end at step 350.

In an alternate implementation of method 300, two or more devices may be coupled together using management communications interfaces included thereon. A routine similar to method 300 may be executed on one or more of the devices to indicate the cabling connections to be made between the computing components and the respective port or ports included on each. Through altering the computing components coupled together, an entire computing system may be appropriately and effectively cabled.

In summary the present disclosure provides a method and system operable to identify the computing components to be incorporated into a computing system. By generating signals on the computing components, a cable installer is able to cable the computing system accurately, efficiently and completely without having to wrestle with the limitations in existing methods of computing system cable installations. The present disclosure also provides verification that computing components of a computer system have been properly cabled or interconnected with each other. The present disclosure may be applied to generally all types of computing components including, but not limited to, servers, switches, hubs, storage devices, routers, etc.

Although the disclosed embodiments have been described in detail, it should be understood that various changes, substitutions and alterations can be made to the embodiments without departing from their spirit and scope.

What is claimed is:

1. A method for cabling a plurality of computing components for a desired installation, the method comprising:
   automatically identifying a first computing component and a second computing component for connection according to a predetermined cabling sequence for connecting the plurality of computing components;

automatically determining a type of cabling connection to be made between the first and second computing components;

automatically identifying, from a plurality of first physical ports on the first computing component, a particular first physical port to be used for manual cable connection to a second physical port on the second computing component for physically connecting the first and second computing components;

before the particular first physical port on the first computing component is manually connected to the second physical port on the second computing component, generating a user-detectable illumination signal on the first computing component indicating the particular first physical port, the user-detectable illumination signal assisting a user in determining which of the plurality of first physical ports to manually connect by cable to the second physical port on the second computing component; and repeating the steps of identifying physical ports for manual cable connection and generating illumination signals until each of the plurality of computing components has been connected as desired for the installation.

2. The method of claim 1 further comprising, before automatically identifying the particular first physical port of the first computing component:

identifying the first computing component to be connected to the second computing component; and identifying the second computing component to be connected to the first computing component.

3. The method of claim 1 further comprising:

identifying at least one port on the first computing component to be connected to at least one port on the second computing component; and identifying at least one port on the second computing component to be connected to at least one port on the first computing component.

4. The method of claim 1 further comprising illuminating at least one LED on the first computing component and at least one LED on the second computing component indicative of the cabling connection to be made between the first computing component and the second computing component.

5. The method of claim 1 further comprising establishing communications with at least one computing component to be connected via a management communications interface.

6. The method of claim 1 wherein the illumination signal indicates a type of cabling connection to be made between the first and second computing components.

7. The method of claim 1 further comprising verifying completion of the cabling connection between the first computing component and the second computing component.

8. The method of claim 1, further comprising:

identifying, from a plurality of second physical ports on the second computing component, a particular second physical port and to be physically connected to the identified particular first physical port on the first computing component; and before the identified first physical port on the first computing component is physically connected to the second physical port on the second computing component, generating an illumination signal on the second computing component indicating the particular second physical port identified to be physically connected to the identified particular first physical port on the first computing component.

9. An information handling system, comprising:

at least one processor;

memory operably associated with the at least one processor;

a management communications interface operably coupled to the processor and the memory;

the management communications interface operably coupled to a communications network;

a program of instructions storable in the memory and when executed by the processor operable to:

automatically identify a first computing component and a second computing component for connection according to a predetermined cabling sequence for connecting a plurality of computing components;

automatically determine a type of cabling connection to be made between the first and second computing components;

automatically identify, from a plurality of first physical ports on the first computing component, a particular first physical port to be used for manual cable connection to a second physical port on the second computing component for physically connecting the first and second computing components;

before the particular first physical port on the first computing component is manually connected to the second physical port on the second computing component, generate a user-detectable illumination signal on the first computing component indicating the particular first physical port, the user-detectable illumination signal assisting a user in determining which of the plurality of first physical ports to manually connect by cable to the second physical port on the second computing component; and repeat the steps of identifying physical ports for manual cable connection and generating illumination signals until each of the plurality of computing components has been connected as desired.

10. The information handling system of claim 9 further comprising:

the program of instructions further operable to identify, from a plurality of second physical ports on the second computing component, a particular second physical port on the second computing component to be connected to the particular first physical port on the first computing component.

11. The information handling system of claim 10 further comprising:

the program of instructions operable to generate a user-detectable illumination signal on the second computing component indicating the particular second physical port included thereon to be manually connected by cable to the particular first physical port included on the first computing component.

12. The information handling system of claim 9 further comprising the program of instructions operable to illuminate at least one LED on the first computing component indicative of the particular first physical port to be used for manual cable connection with the second computing component.

13. The information handling system of claim 9 further comprising the program of instructions operable to alter the illumination signal on the first computing component to indicate a type of cabling connection to be made between the first and second computing components.

14. A method for physically connecting a plurality of computing components for a desired installation, the method comprising:
   automatically identifying from the plurality of computing components a first computing component and a second computing component to manually cable to each other, according to a predetermined connection sequence;
   automatically determining a type of cabling connection to be made between the first and second computing components;
   automatically identifying, from a plurality of first physical ports on the first computing component, a particular first physical port to be used for manual cable connection to a second physical port on a second computing component for physically connecting the first and second computing components;
   before the identified first and second computing components are manually connected to each other, generating a user-detectable illumination signal on each of the first and second computing components, the user-detectable illumination signals assisting a user in identifying which of the plurality of first physical ports to manually cable to the second physical port on the second computing component; and
   repeating the steps of identifying pairs of computer components to manually cable to each other and generating illumination signals on each of the identified computer components until each of the plurality of computing components has been connected as desired for the installation.

15. The method of claim 14, wherein generating a user-detectable illumination signal on each of the first and second computing components comprises illuminating at least one LED on the first computing component and at least one LED on the second computing component to assist the user in identifying which of the plurality of computing components to manually connect to each other.

16. The method of claim 14, wherein the illumination signal indicates a type of cabling connection to be made between the first and second computing components.

17. The method of claim 14, further comprising:
   accessing a predetermined cabling sequence in which each of the plurality of computing components are to be connected; and
automatically identifying the first and second computing components for connection according to the predetermined cabling sequence.

* * * * *